W. F. STIMPSON.
SCALE.
APPLICATION FILED MAY 4, 1912.
1,118,517.
Patented Nov. 24, 1914.
2 SHEETS—SHEET 2.
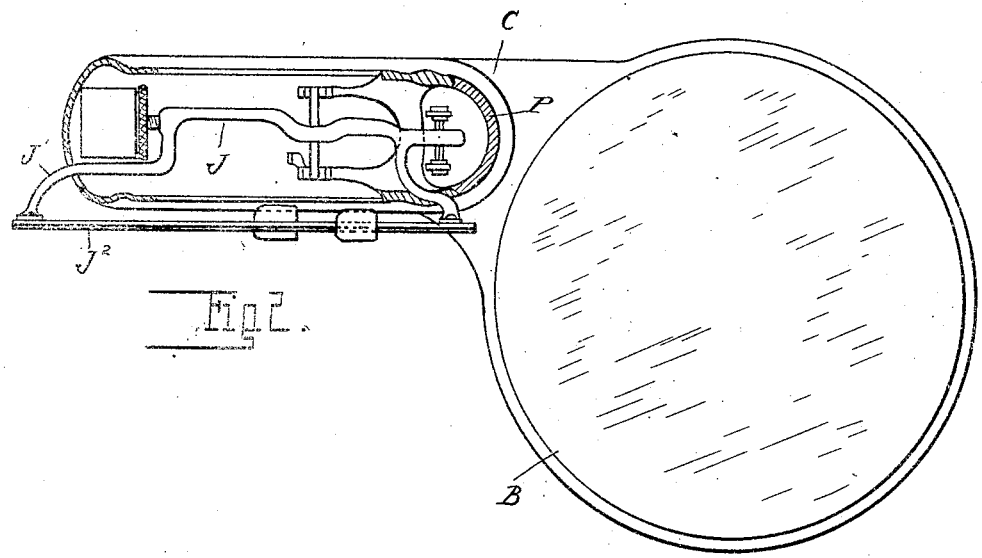
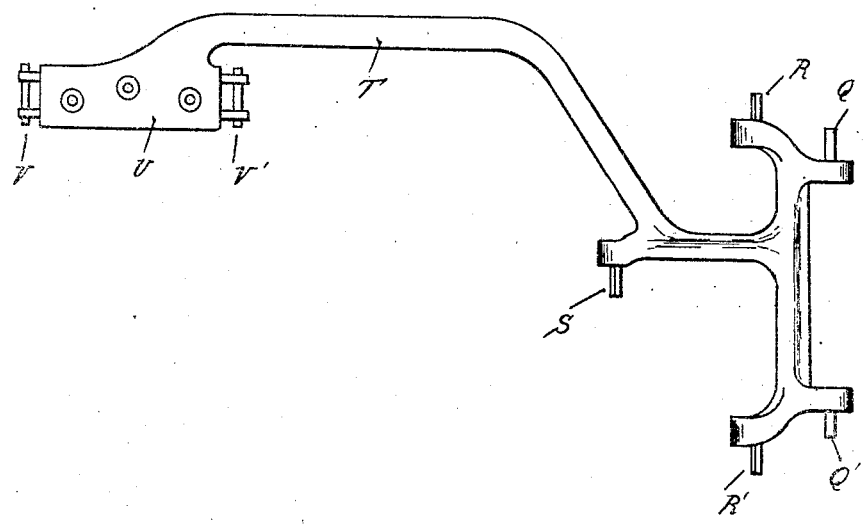

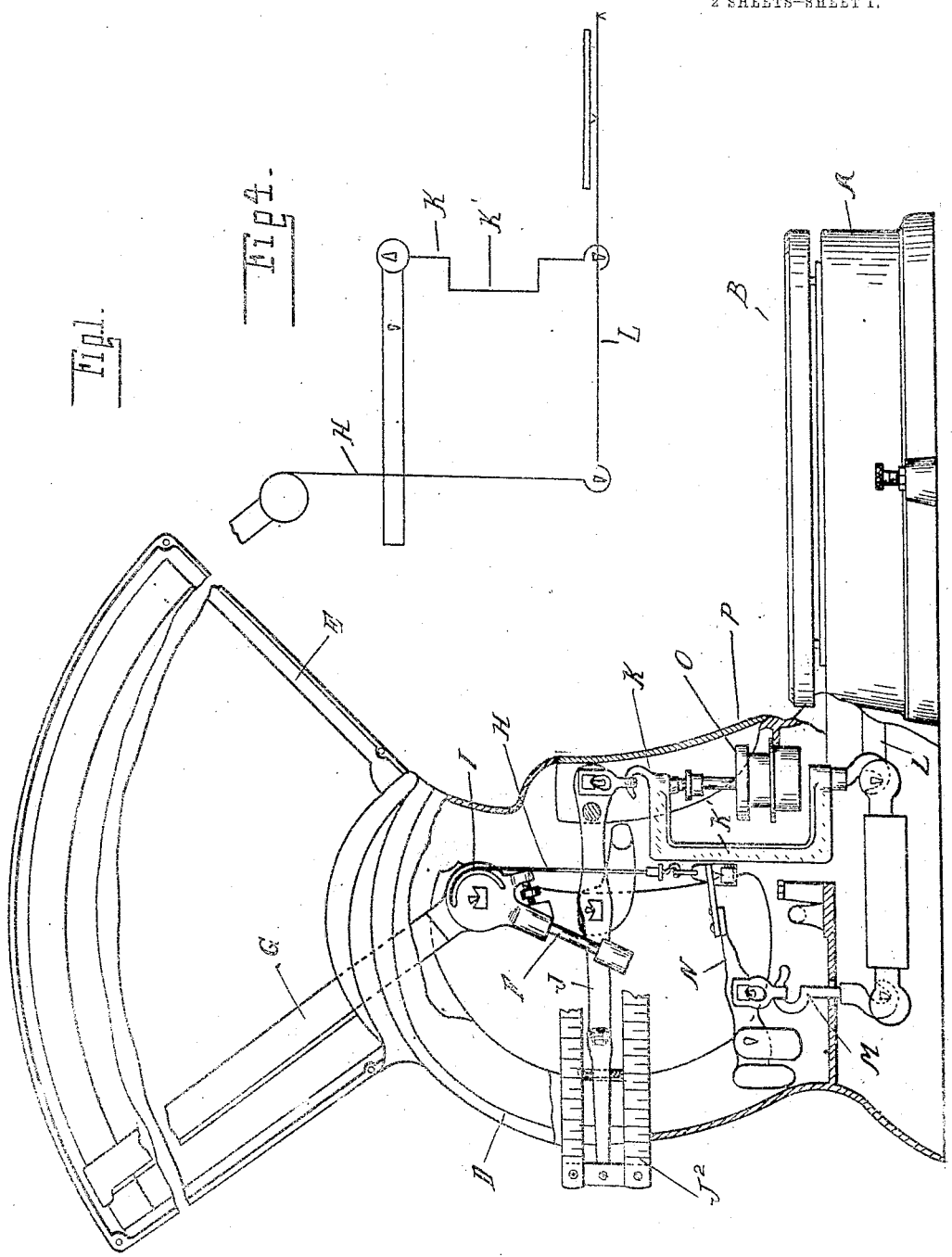

UNITED STATES PATENT OFFICE.

WALTER F. STIMPSON, OF DETROIT, MICHIGAN, ASSIGNOR TO GEORGE W. HURD, OF DUNDEE, MICHIGAN.

SCALE.

1,118,517.  Specification of Letters Patent.  Patented Nov. 24, 1914.

Application filed May 4, 1912. Serial No. 695,014.

*To all whom it may concern:*

Be it known that I, WALTER F. STIMPSON, a citizen of the United States of America, residing at Detroit, in the county of Wayne and State of Michigan, have invented certain new and useful Improvements in Scales, of which the following is a specification, reference being had therein to the accompanying drawings.

The invention relates to scales of that type known as automatic in which a pendulum weight and an index hand are associated and actuated by a connection with the platform levers. It is usual to provide such scales with a tare beam also actuated from the platform levers and in some instances a common actuating connection or steelyard rod has been employed for operating both the tare beam and the pendulum weight. It is however, desirable to limit the angular movement of the tare beam while the angular movement of the pendulum weight is necessarily much greater, and where a common actuating connection is used the construction is not altogether satisfactory.

It is the object of the present invention to overcome this difficulty by a construction and arrangement of parts in which there is a differential leverage exerted by the platform lever upon the pendulum weight actuating connection and the tare beam actuating connection, the former having a greater degree of movement.

It is a further object to accomplish this result by a simple, compact and advantageous arrangement of the parts as hereinafter set forth.

In the drawings,—Figure 1 is a sectional elevation of the scale with the cap in place; Fig. 2 is a sectional plan view thereof with the cap in place; Fig. 3 is a plan view of the platform lever; and Fig. 4 is a diagram showing a modified construction.

A is the frame having a weight platform B arranged above a portion thereof, and a lateral off-set extension C upon which an upwardly extending frame D is mounted with a weight indicating and computing chart E at the upper end thereof.

F is the pendulum weight which is fulcrumed on suitable knife edge bearings in the upper portion of the frame D, and G is the index hand attached to said pendulum weight and extending over the chart E. The pendulum weight and index have a common actuating device consisting of a flexible tape H which pass around a cam or eccentric pulley I forming a correcting device for causing an equal angular movement of the index for equal increments in weight on the platform, the parts thus far described being all of well known construction.

J is a beam which is fulcrumed within the frame D and is provided with outwardly extending arms J' to which the tare beam J² is secured, this being arranged outside of the frame D. To actuate this beam with a limited angular movement, an actuating connection or steelyard K is attached to its inner end or the end that is nearest to the platform, the lower end of said steelyard being connected with the platform lever L. For actuating the flexible tape H the lever L is extended to provide increased movement at the point of its connection to the tape actuating means. Thus in the construction shown in Figs. 1 and 2 the outer end of the lever L is connected to a steelyard M which operates an intermediate multiplying lever N, the free end of which is attached to the tape H. This provides not only the increased leverage of the longer arm of the lever L but also the multiplication of the intermediate lever N. Consequently the movement imparted to the tape H is much greater than that imparted to the steelyard K for actuating the tare beam. In the diagram Fig. 4 the construction is modified and both the tape and the steelyard K are directly attached to the lever L but the points of attachment are separated so as to give a greater movement to the former.

In the construction shown in Figs. 1 and 2 which is the preferred form, the steelyard K has a lateral bend or off-set portion K' which provides space for the arrangement of a dash pot O in alinement with the end portions of said steelyard. This is a convenient location for the dash pot out of the way of the other mechanism of the scale, and access is obtained by providing a detachable cap P for a portion of the frame D. This frame D is preferably formed of separated standards of channel shape section and the space in between is sufficient to accommodate the pendulum weight, the beam J, the lever M, and other connections.

The lever L is preferably of the form shown in Fig. 3 in which Q and Q' are the fulcrum knife edge pivots, R R' the form knife edge pivots, and S is the central pivot for connecting with the coöperating platform lever, (not shown). The weight and beam actuating arm T is off-set to extend through the off-set portion C of the scale frame and at its outer end has the inwardly off-set portion U at the opposite ends of which are the knife edge pivots V and V', the former of these pivots is attached to the steelyard M or other actuating device for the flexible tape H, while the pivot V' engages the steelyard K.

With the construction described in operation, the movement imparted to the tape through the long leverage of the platform lever and the multiplication of the intermediate lever N, is sufficient to actuate the pendulum weight F and the index G to the limit of movement and without an undesirable degree of multiplication in the cam pulley I. In other words, this pulley I may be made of larger diameter and consequently is more accurate in its operation than where a lesser degree of movement is imparted to the tape H. On the other hand, the steelyard K being attached to the lever L much nearer its fulcrum and being unprovided with any intermediate multiple mechanism, will impart a comparatively small degree of movement to the beam J so that the angular movement of the latter is not excessive.

What I claim as my invention is:

1. In a scale, the combination of a pendulum weight, a beam, a platform, a platform lever having an arm for actuating said pendulum weight and beam, connections between said pendulum weight and arm, and connections between the latter and the beam, said connections respectively engaging said arm at separated points, whereby the movement of the weight actuating connection is greater than that of the beam actuating connection.

2. In a scale, the combination of an angularly movable member provided with a pendulum weight and an index, a platform lever, a vertically-extending connection for angularly operating said member, a beam extending on opposite sides of said vertical connection, a horizontal lever, actuating means operatively connecting said vertical connection and said lever, and a separate connection from said beam to said platform lever engaging the latter at a point nearer its fulcrum than the point of engagement with the actuating means for said vertical connection.

3. In a scale, the combination of an angularly movable member having a pendulum weight and an index attached thereto, a vertically-extending connecting means engaging said member to actuate the same, a beam, a platform lever, and actuating means operatively connecting the vertically-extending connection means and the outer end of the platform lever, and a separate steelyard rod connection between said beam and said platform lever engaging the latter at a point nearer its fulcrum.

4. In a scale, the combination with a base frame having a platform portion and a lateral extension, of an upwardly extending frame mounted on said lateral extension, an angularly movable member supported upon said upwardly extending frame and provided with a pendulum weight and an index, a beam fulcrumed upon said upwardly extending frame, a platform lever having an arm extending in said lateral extension of the frame, a connection between the outer end of said arm and said angularly movable member for actuating the latter, and a connection between said beam and said arm at a point nearer the fulcrum.

5. In a scale, the combination with a frame or base having a platform portion and a lateral extension, an upwardly extending frame upon said lateral extension, an angularly movable member mounted on said upwardly extending frame and provided with a pendulum weight and an index, a platform lever having an arm extending into said lateral extension of the base frame, a steelyard connection to the end of said arm, a draw-connection for said angularly movable member, a multiplying lever between said steelyard connection and draw-connection, and a steelyard connection between said beam and said arm at a point nearer the fulcrum of the latter than the point of engagement of said first mentioned steelyard.

6. In a scale, the combination with a base frame having a platform portion and a lateral extension, of an upwardly extending frame on said lateral extension, a beam fulcrumed upon said upwardly extending frame, a platform lever having an arm extending into said lateral extension of the base frame, a steelyard connection between said arm and said beam having a portion said off-set inwardly, the outer side of said off-set portion being open, and a dash pot within the space provided by said off-set portion.

7. In a scale, the combination with a base frame having a lateral extension, of a hollow frame extending upward from said lateral extension, a beam fulcrumed within said hollow frame, a platform lever having an arm projecting into said lateral extension of the base frame, a steelyard connection between said arm and beam at one side of said hollow frame and provided with an off-set portion, a dash pot located in the space provided by said off-set portion, and a detachable plate on said frame for providing access to said dash-pot.

8. In a scale, the combination with a base frame having a lateral extension, of an upwardly extending hollow frame on said lateral extension, a weight indicating and computing chart at the upper end of said upwardly extending frame, an angularly movable member fulcrumed in said upwardly extending frame and having a pendulum weight and an index for coöperating with said chart, a beam extending horizontally within said hollow frame, a lever within said base frame having an arm extending into the lateral extension thereof, a connection between the outer end of said arm and said angularly movable member for actuating the latter, a steelyard connection between the end of said beam nearest the platform and said arm, said steelyard connection being provided with an offset portion in the plane of said arm, and a dash-pot located in the space provided by said off-set portion and connected with said steelyard.

9. In a scale, the combination with a platform, of a platform supporting lever forming an outwardly extending arm, said arm having an off-set portion and a plurality of knife edge pivots mounted upon said off-set portion at different distances from the fulcrum thereof and adapted for respective engagement with a plurality of steelyard connections.

10. In a scale, the combination with a platform, of a platform supporting lever having an outwardly extending arm, a laterally projecting portion at the outer end of said arm, and steelyard engaging pivots at opposite ends of said laterally projecting portion and at different distances from the fulcrum.

In testimony whereof I affix my signature in presence of two witnesses.

WALTER F. STIMPSON.

Witnesses:
W. J. BELKNAP,
JAMES P. BARRY.